United States Patent

D'Onofrio

Patent Number: 5,394,689
Date of Patent: Mar. 7, 1995

[54] GAS TURBINE ENGINE CONTROL SYSTEM HAVING INTEGRAL FLIGHT MACH NUMBER SYNTHESIS METHOD

[75] Inventor: Joseph D'Onofrio, Salem, Mass.

[73] Assignee: General Electric Company, Cincinnati, Ohio

[21] Appl. No.: 124,877

[22] Filed: Sep. 22, 1993

[51] Int. Cl.$^6$ .............................................. F02C 9/28
[52] U.S. Cl. ...................................... 60/204; 60/243; 60/39.281
[58] Field of Search ................. 60/204, 233, 235, 239, 60/243, 39.2, 39.281; 73/488, 497, 509, 521; 324/160, 161, 163; 364/431.02

[56] References Cited

U.S. PATENT DOCUMENTS

| | | | |
|---|---|---|---|
| 3,617,721 | 11/1971 | Foster | 73/488 |
| 3,656,301 | 4/1972 | Katz . | |
| 3,717,038 | 2/1973 | Plett et al. | 73/115 |
| 3,738,102 | 6/1973 | Stearns et al. . | |
| 3,797,233 | 3/1974 | Webb et al. . | |
| 3,936,226 | 2/1976 | Harner et al. . | |
| 4,242,864 | 1/1981 | Cornett et al. | 60/239 |
| 4,277,940 | 7/1981 | Harner et al. | 60/243 |
| 4,294,069 | 10/1981 | Camp | 60/239 |
| 4,528,812 | 7/1985 | Cantwell | 60/39.281 |
| 4,748,804 | 6/1988 | Krukoski | 60/39.281 |
| 4,829,813 | 5/1989 | Syed . | |
| 5,133,182 | 7/1992 | Marcos . | |

*Primary Examiner*—Louis J. Casaregola
*Attorney, Agent, or Firm*—Jerome C. Squillaro; Bernard E. Shay

[57] ABSTRACT

A gas turbine engine digital electronic control is disclosed which is capable of maintaining safe, efficient engine thrust levels in the event of loss of communication with an aircraft flight computer. Specifically, a limited number of engine sensor inputs are used in combination with an engine performance schedule to derive total inlet pressure. A compressible flow calculation yields flight Mach number which is used in a power management module to control engine power settings, such as corrected fan speed in a turbofan engine. Various correction factors and scalars are provided to configure the control for a variety of installation configurations, as well as improve system accuracy.

10 Claims, 3 Drawing Sheets

GAS TURBINE ENGINE CONTROL SYSTEM HAVING INTEGRAL FLIGHT MACH NUMBER SYNTHESIS METHOD

TECHNICAL FIELD

The present invention relates generally to aircraft gas turbine engine control systems and more specifically to a method and apparatus for maintaining engine thrust performance in the event of loss of an aircraft supplied flight Mach number (Mn) signal.

BACKGROUND INFORMATION

Conventional aircraft incorporate highly complex, integrated airframe and powerplant control systems. Common sensor signal access, system data exchange and other communication between a flight control computer and a digital electronic control (DEC) of a gas turbine engine is advantageously utilized to reduce pilot workload while maintaining safe, efficient aircraft operation. Since system faults may occasionally occur which disrupt the communication links, critical operational failure modes are typically anticipated and redundant hardware and control functions provided to ensure a high level of system reliability. Where such redundancy is either too costly to provide or not warranted due to the remote likelihood of occurrence of a particular failure scenario, system backup methods are routinely employed. For example, loss of a noncritical sensor signal may cause the DEC to operate the engine in a fail-safe mode, sacrificing fuel efficiency to maintain minimum safe power output.

In the case of a turbofan engine, where thrust is provided by a rotating fan, operational performance is often quantified as a function of flight conditions. Depending on the location of the aircraft in the flight envelope, fan speed may be modulated to maintain a minimum guaranteed thrust level. Hot ambient temperature, high altitude cruising requires higher fan speed to achieve the same thrust as cold, low altitude cruising due to the difference in ambient air density. The correct power scheduling in a DEC of such an engine, usually in terms of low pressure rotor or fan speed, N1, conventionally requires input of altitude, Mn and ambient temperature signals to accurately set fan thrust.

A conventional system may employ a digital transmission link between the aircraft flight computer and the DEC, as some of these signals are typically available as part of aircraft instrumentation; however, to meet safety requirements in the event of loss of communication with the flight computer, the DEC must be capable of maintaining a minimum thrust level without any aircraft input signals. While the DEC usually has available redundant engine sensor signals for inlet total free stream ambient air temperature, T1, and static free stream ambient pressure, P0, used to determine altitude, an aircraft Mn signal is generally not independently available at the engine.

In the event the aircraft Mn signal is lost, the DEC could set fan speed generally higher than necessary to ensure meeting minimum required thrust for the worst anticipated operating conditions. This mode of operation, while providing sufficient operating margin, typically results in higher core and fan rotor speeds, hotter turbine inlet temperatures, increased fuel consumption and a concomitant reduction in engine component life. Further, there may exist regions of the flight envelope, especially in high performance aircraft, where engine limits inhibit such aggressive operating parameters, due for example to stall margin boundaries.

Alternatively, upon loss of the aircraft Mn signal, the DEC could generate an independent Mn value, based upon independent sensor signal inputs. A conventional method of deriving Mn at a given point in a gas flow entails measuring the total gas pressure and the static gas pressure at the point of interest. Since Mn is a function of the ratio of total to static pressures, the Mn value may be readily computed if the appropriate pressure signals are available. While such a direct measurement method could be employed, the cost, weight and complexity associated with the addition of dedicated pressure sensors used solely for backup modes of operation is typically not warranted. Further, this method produces a value for the Mn of the flow proximate the sensors, which may be located in a fan bypass duct, for example, or other location remote from aircraft ambient, the Mn value of interest. Placement of sensors external to the engine configuration is generally beyond the purview of the engine manufacturer and would simply replicate existing aircraft sensors. Yet further, additional wiring harnesses and connectors required to provide remote sensor signals to the DEC comprise additional failure nodes which compromise overall system reliability.

Another method of deriving aircraft Mn is to use engine sensors, including an inlet pressure sensor, in combination with a multivariable engine operating parameter schedule to calculate the total to static pressure ratio, P1/P0, proximate the engine inlet. In a particular exemplary control system, engine sensor inputs comprise fan speed, N1, inlet temperature, T1, inlet duct static pressure, PS12, and ambient static pressure, P0. T1 is used in combination with N1 to generate a value of corrected fan speed, N1R. Based on inputs of N1R and the measured ratio PS12/P0, a value for inlet total pressure, P1, may be generated since the relationship between N1R, PS12 and P1 is quantifiable for a fixed inlet area. P1 may then be used in a ratio with measured P0 to generate Mn as described hereinabove.

Use of any such method necessitates a sensor set which includes an inlet pressure sensor. Many engines do not have the requisite sensor signals available, especially PS12; therefore, a single use PS12 sensor would have to be incorporated, along with the associated cost, weight and reliability penalties associated therewith. Alternatively, compressor discharge static pressure (CDP) sensors are widely used in modern engines to support a variety of control functions, including preventing combustor case overpressure, maintaining compressor surge margin and setting minimum flight idle conditions. Advantageous use of the available CDP signal, also referred to as PS3, in a Mn synthesis method would obviate the need to provide a separate inlet sensor in engines of this type, as well as the associated wiring harness and connectors.

SUMMARY OF THE INVENTION

A turbofan engine control system incorporates a thrust control apparatus and associated method which comprises the steps of utilizing a plurality of available engine sensor signals in combination with one or more predetermined engine operating parameter schedules and a physical flow relationship to calculate airframe Mn, which is used in a power management module (PMM) to modulate fan speed and achieve a desired thrust level. More particularly, fan speed N1, multiplied by a correction factor R based on engine inlet airflow temperature T1, is input into an engine schedule. The schedule outputs the combined compression ratio of the fan and the compressor PS3/P1, which is a function of corrected fan speed N1R, where PS3 is the compressor discharge static pressure, also commonly referred to as CDP, and P1 is the inlet total pressure.

The schedule output, PS3/P1, is divided into the measured CDP, which is then divided by the measured free stream ambient static pressure P0. The resulting quotient, the ratio of inlet total pressure to free stream static pressure or P1/P0, may be used directly in a compressible flow relationship equation to yield a calculated aircraft Mn value. The calculated Mn value is used conventionally, in place of the airframe flight computer supplied Mn signal in the PMM, to set fan speed, N1, by modulating fuel flow, for example. One or more scalars and additional correction factors may be employed to compensate for sensor signal or schedule modeling errors or to compensate for variable selective schedule characteristics, such as those associated with compressor bleed airflow extraction.

BRIEF DESCRIPTION OF DRAWINGS

The novel features believed characteristic of the invention are set forth and differentiated in the claims. The invention, in accordance with preferred and exemplary embodiments, together with further objects and advantages thereof, is more particularly described in the following detailed description taken in conjunction with the accompanying drawings in which:

MODE(S) FOR CARRYING OUT THE INVENTION

Figure 1:
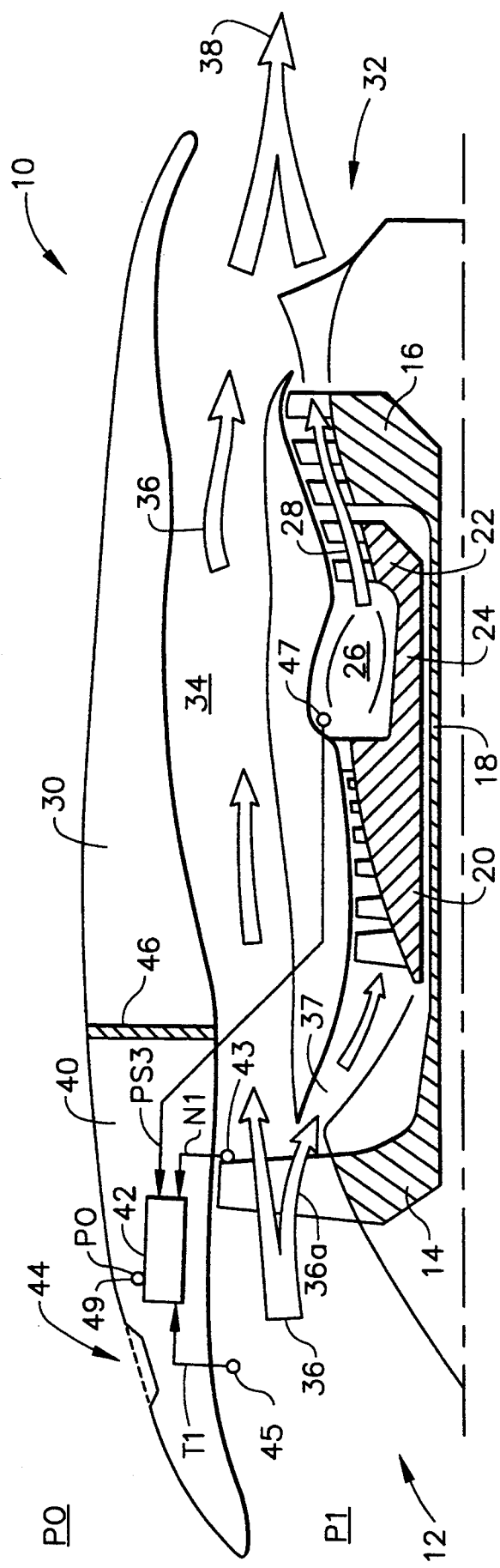
FIG. 1 is a schematic representation of a turbofan engine for powering aircraft in flight having a thrust control system with integral Mn synthesis in accordance with one embodiment of the present invention.

FIG. 1 depicts a schematic representation of a turbofan engine 10 comprising an inlet 12, a thrust producing fan 14 driven by a low pressure turbine (LPT) 16 via low pressure rotor shaft 18, and a multistage, axi-centrifugal compressor 20 driven by a high pressure turbine (HPT) 22 via high pressure rotor shaft 24. The engine 10 is surrounded by a nacelle 30 which extends from the inlet 12 to an exhaust portion 32 creating an annular fan duct 34 through which pressurized fan gas flow 36 passes. A portion 36a of fan flow 36 enters a core portion 37 of the engine 10 where it is further compressed by the compressor 20. Flow portion 36a is then combined with fuel and ignited in a combustor 26, producing a high temperature, high energy core gas flow 28 from which energy is extracted in the HPT 22 and LPT 16 to power the engine 10. Core and fan flows 28, 36 are combined in the exhaust portion 32 into a combined flow 38 to provide thrust.

While one type of turbofan engine 10 is being described here, the teachings of the subject invention are applicable to engines of varied configuration, including dual stream turbofan engines with axially shortened nacelles which do not recombine core and fan flows, as well as turbojet engines which comprise a single, thrust producing core flow.

In this particular application, a DEC 42 is housed within a forward cavity 40 of the nacelle 30. The DEC 42 may be of the full authority type, commonly referred to as a FADEC, and there may be more than one DEC 42 provided for system redundancy. To facilitate disclosure, the control features of a single DEC 42 will be described, the features and function of a second control being similar. The DEC 42 receives the output signals of a number of engine sensors, including a fan speed signal, N1, from a fan speed sensor 43, an inlet temperature signal, T1, from an inlet temperature sensor 45 and a compressor discharge pressure signal, PS3, from a CDP sensor 47, located proximate the combustor 26, for example. Additionally, in this particular configuration, P0 sensor 49, mounted on the DEC 42, provides a free stream ambient static pressure signal, P0. A vent 44 in the nacelle 30 provides ambient air flow communication end pressure normalization with the forward cavity 40, which is bounded in part by aft firewall 46.

Figure 2:
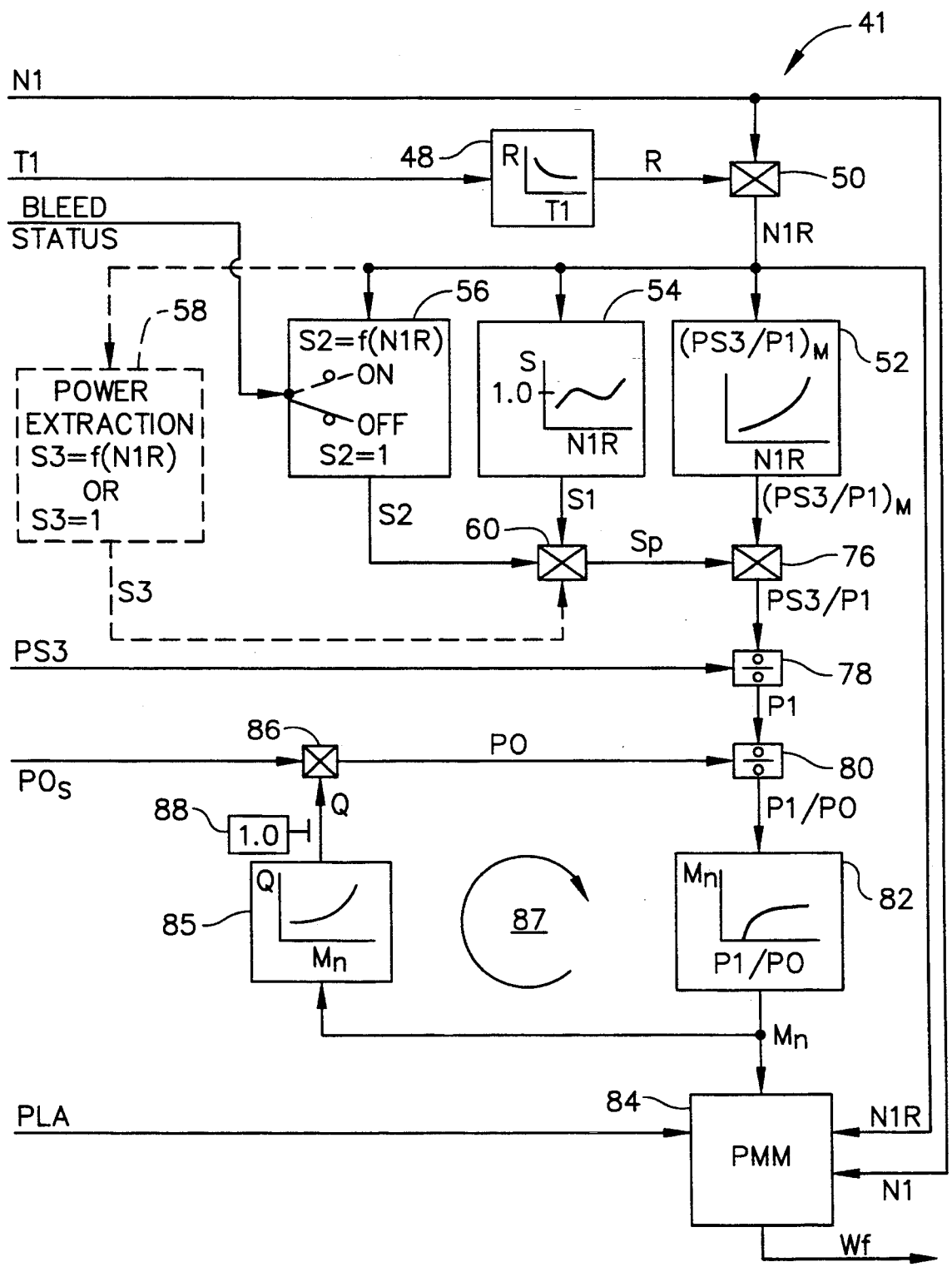
FIG. 2 is a schematic representation of the thrust control system in accordance with a preferred embodiment for the engine depicted in FIG. 1.

Referring now to FIG. 2, shown is a schematic representation of a preferred embodiment of a control system 41 utilizing the available engine sensor inputs depicted in FIG. 1 to compute aircraft Mn, command fan speed N1 and set engine thrust. As is well known in the art, engine performance schedules are oftentimes generated as a function of corrected fen speed N1R, which is fen speed N1 which has been normalized to a standard day temperature condition to compensate for differences in air density. Fan speed N1 is multiplied by a correction factor R, defined as a function of inlet temperature T1. The T1 signal value is converted into the dimensionless correction factor value R according to a first predetermined relationship, shown in FIG. 2 as block 48 end defined by the following formula:

$$R = 1/(T1/518.67)^{\frac{1}{2}}$$

where T1 is in terms of degrees Rankine. The physical or measured fan speed N1 is multiplied in first multiplier 50 by correction factor R to produce a value of corrected fan speed, N1R.

N1R is then input into a predetermined engine schedule 52 which may be based on a thermodynamic model of the engine 10. In a preferred embodiment, schedule 52 comprises a plot of total compression pressure ratio, (PS3/P1)M, as a function of corrected fan speed N1R as mentioned hereinabove, where P1 is the total pressure at the inlet 12 forward of the fan 14 as shown in FIG. 1. For a given value of N1R, schedule 52 outputs a corresponding value of the modeled system ratio parameter (PS3/P1)M. While the output value may be used as is, any error inherent in the engine model with respect to the actual performance characteristics of the engine 10 will contribute to error in the Mn value determination and ultimately engine thrust. The capability has therefore been provided in the DEC 42 to provide additional compensation or correction of the system ratio parameter to improve the accuracy of the computed Mn value. A first scalar value, S1, may be based on the correlation of actual engine test results with the engine model data comprising schedule 52. A correction schedule 54 is provided with N1R as a control input. For values of corrected fan speed, N1R, where schedule 52 outputs a correct ratio value, that is to say where no compensation is required, scalar value S1 is equal to unity. For other values where the output of model schedule 52 is less accurate, the value of scalar S1 may be increased or decreased accordingly. If found to be desirable, model and correction schedules 52, 54 may be combined into a single schedule; however, the facility to modify the correction schedule 54 without changing the baseline engine model schedule 52 has been found to be advantageous.

Configuring the control system logic in this manner facilitates the addition of other scalar factors which may enhance system accuracy and be suited to each particular engine configuration. Again, in a preferred embodiment, use of the system ratio parameter, PS3/P1, as the primary control schedule is somewhat complicated by the various operational states of the engine. Compressor bleed systems which provide compressed air for various airframe systems are generally incorporated in conventional engines. Since bleed flows are parasitic to engine performance and ultimately thrust produced, flight control systems are utilized to selectively activate and deactivate bleed flow based on airframe requirements. Clearly, such a situation affects the actual compression pressure ratio, PS3/P1, and therefore the accuracy of the modeled pressure ratio, (PS3/P1)M, even with the correction scalar S1. A bleed schedule 56 is therefore incorporated having both N1R and Bleed Status inputs. When the status signal, which may be provided to the DEC 42 by the flight control computer, indicates that external airframe bleed has not been activated, the value of a second scalar value, S2, is set to unity; however, when bleed is selected and the status toggle switches on, the value of S2 may be set at a constant value or as a function of N1R according to the particular bleed schedule 56.

Figure 3:
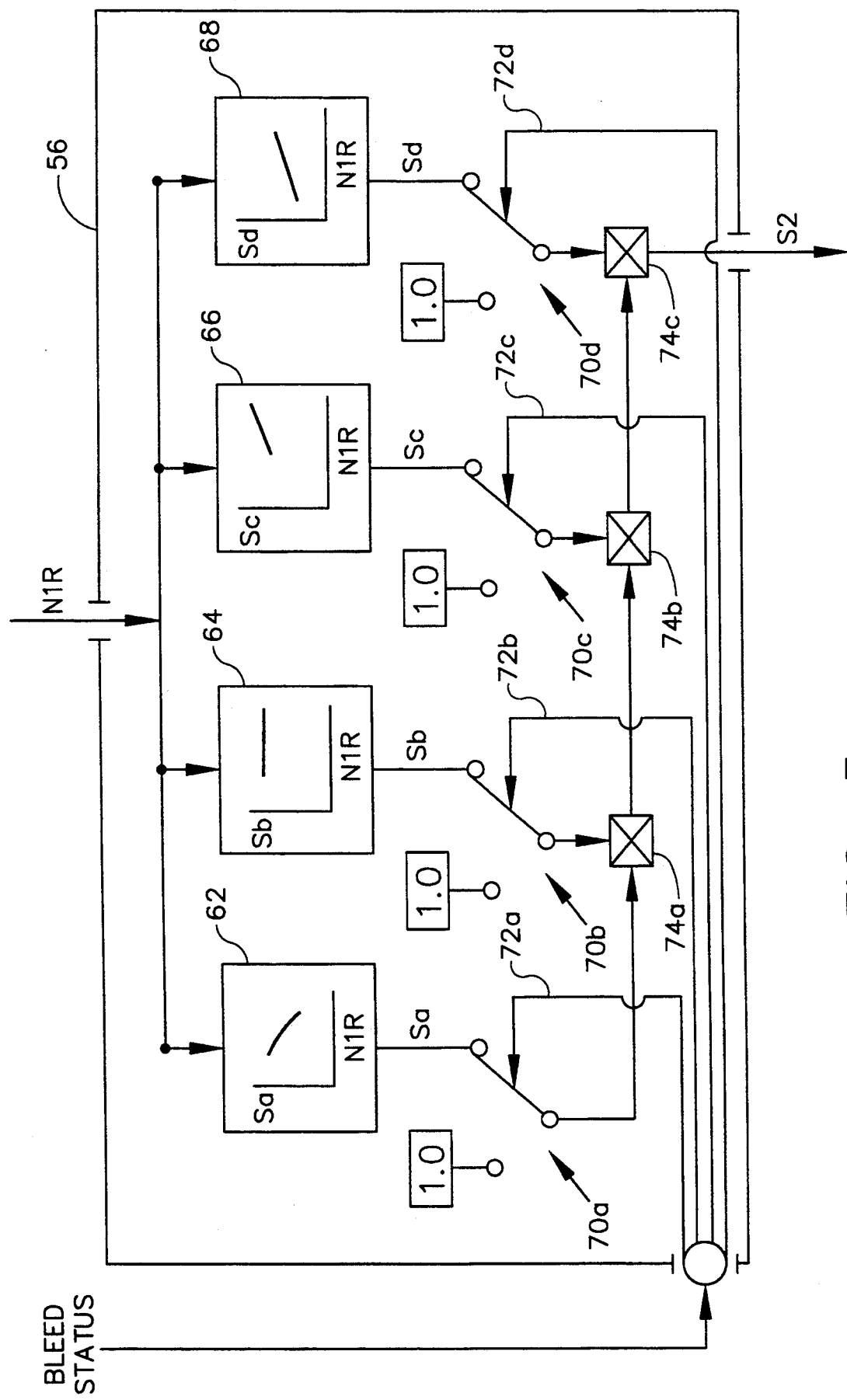
FIG. 3 is a schematic representation of a portion of the thrust control system depicted in FIG. 2 providing additional detail.

Conventional aircraft often incorporate multiple compressor bleed systems to support a plurality of airframe system requirements. The simplified bleed schedule 56 depicted in FIG. 2 may in a preferred embodiment more closely resemble the more complex scheduling shown in FIG. 3, comprising a wing anti-icing schedule 62, nacelle anti-icing schedule 64, environmental control system (ECS) schedule 66, and auxiliary ECS schedule 68 having individual discrete scalar values Sa, Sb, Sc and Sd associated respectively therewith. The bleed sources in the compressor 20 may be the same or different and actuation of each bleed system may be related or occur independently. Each schedule therefore may include a dedicated bleed toggle 70a, 70b, 70c and 70d to selectively output a respective scalar value which is a function of N1R, or unity depending on the state of the bleed status control line 72a, 72b, 72c or 72d associated therewith. Individual status lines 72a, 72b, 72c and 72d may be set differently, depending on the operational state of the engine 10. The discrete scalar values are combined in a series of bleed multipliers 74a, 74b and 74c, the product of which is second scalar value S2, shown in FIG. 2.

Any number of additional scalars may be incorporated if warranted to accommodate discrete engine operational states which affect the accuracy of the modeled ratio, (PS3/P1)M. For example, FIG. 2 depicts a power extraction schedule 58 shown in phantom which could be utilized to provide a third scalar value S3 in an application characterized by variable power extraction from the engine by the airframe. A power extraction status toggle could be incorporated, similar to the bleed status toggle, if power extraction were selectively activated, for example, by means of a clutch drive system. Whatever the number and type, the scalars, S1, S2, etc. are multiplied together in a second multiplier 60 to yield a scalar product $S_P$ which is multiplied with the modeled ratio, (PS3/P1)M, in a third multiplier 76 to produce the system ratio parameter, PS3/P1.

The parameter, PS3/P1, is subsequently divided into a measured value of PS3 from CDP sensor 47 in first divider 78 to yield a first quotient having a calculated value of P1. First quotient P1 is then divided by a value of P0 from sensor 49 in second divider 80 to yield a second quotient, which is the ratio of inlet total pressure, P1, to ambient static pressure, P0, or simply P1/P0. Knowing the ratio of total to static pressure at the inlet 12 of the engine 10, the value of aircraft Mn may be readily determined according to a second predetermined relationship, shown in FIG. 2 as block 82 and defined by the following formula:

$$Mn = ((2/y-1)((P1/P0)^{y-1/y}-1))^{\frac{1}{2}}$$

where y is the ratio of specific heat at constant pressure divided by specific heat at constant volume of the fluid of interest. This formula is conventionally known and applicable to compressible air flow applications. The value of y for air throughout the aircraft flight envelope is substantially constant and equal to about 1.4. Substituting this value in the equation, the formula reduces to:

$$Mn = (5((P1/P0)^{0.2857}-1))^{\frac{1}{2}}$$

Referring again to FIG. 2, for any value of P1/P0 output from second divider 80, block 82 outputs a calculated aircraft Mn value which is provided to a power management module (PMM) 84 of the DEC 42.

The PMM 84 contains the logic and schedules necessary to control engine thrust, in this particular application, fan speed, N1. In addition to Mn, the PMM 84 may require input signals comprising physical and corrected fan speed, N1, N1R and power lever angle (PLA) which is the thrust level demand signal from the pilot. In a preferred embodiment, PMM 84 compares the PLA thrust demand with the actual thrust being produced, based on N1R, and may modulate fuel flow to the combustor 26 by means of a fuel flow demand signal Wf output to a fuel control as part of a closed loop control system to drive any quantified fan speed thrust error to zero. The particular details of such control systems are conventional and known to those having skill in the art and typically include additional inputs and logic to prevent detrimental operating conditions such as rotor overspeed and turbine overtemperature.

Performance of the subject control system 41 depends on the validity and accuracy of the various control schedules and sensor signals. As mentioned hereinbefore, correction schedule 54 is utilized to adjust the output of the model schedule, (PS3/P1)M, to match empirical data collected during instrumented engine testing, providing a calculated compression ratio, PS3/P1, with a high degree of correlation with the actual operating engine pressure ratio. Similar treatment may be afforded other signal values of the control which are subject to error, for example, due to sensor placement. Specifically, the free stream static pressure P0 sensor 49 is mounted on the DEC 42 in nacelle cavity 40. Although flow communication with ambient is provided by vent 44, it can be appreciated that some correlation error may occur depending on P0 sensor 49 placement so that the output, P0s, of the sensor 49, while accurate with respect to its location in cavity 40, may not accurately represent the actual free stream static pressure, P0, external to the nacelle 30. Such an error would be incorporated in the Mn calculation and ultimately in the commanded fan speed thrust level. Testing has shown the correlation error to be quantifiable as a function of aircraft Mn.

A second correction factor Q may be quantified, for example, in a closed loop feedback control 87 as a function of previously calculated Mn in a third predetermined relationship 85, and multiplied with P0s in a fourth multiplier 86 as shown in FIG. 2 to compensate such correlation errors. The loop 87 is conventionally designed to ensure stable control system operation and may include correction factor limits, such as a minimum limiter 88 having a value equal to unity. In this manner, the control system 41 affords a significant degree of installation flexibility and may be tailored to achieve accurate results for each particular aircraft configuration. Such a feature obviates restrictive sensor placement requirements which might otherwise limit the suitability of such a control system 41 in various aircraft applications. Correlation between calculated Mn and actual aircraft Mn data taken during instrumented flight testing of control system 41 has demonstrated excellent data correlation and overall thrust control system performance.

While the preferred embodiment disclosed herein affords computation of flight Mn based on PS3, without direct measurement of inlet total or static pressures, P1, PS12, other sensor sets and quantifiable engine performance schedules may be utilized to achieve similar results. Further, if total compression pressure ratio, PS3/P1, for a particular engine could not be accurately modeled as a function of a single variable such as corrected fan speed N1R, for example, an additional sensor input, such as compressor rotor speed N2 could be utilized. A schedule of PS3/P2, where P2 is compressor inlet pressure, as a function of physical or corrected compressor speed N2, N2R could be used to yield calculated PS3/P2. This ratio may then be multiplied by the output of a separate schedule, comprising P2/P1 as a function of physical or corrected fan speed N1, N1R to yield PS3/P1. Clearly, any required correction factors and scalars necessary to compensate for various operational engine states may be advantageously incorporated as taught herein.

Yet further, while the control system 41 supports continued safe flight operation during periods of loss of aircraft signals, the control system 41 may also be used in an input signal management and verification mode when communication between the DEC 42 and flight computer are intact. Not only can calculated Mn be compared with flight computer supplied Mn, the latter may be utilized to evaluate the condition of engine sensors, such as the CDP sensor 47, for example. Flight computer Mn can be used to derive a calculated PS3 value which may then be compared with a measured PS3 value. A large error between the two values may be indicative of sensor 47 failure. Alternatively, if other operating logic in the DEC 42 confirms the proper function of the CDP sensor 47, an erroneous flight computer Mn signal may be selectively rejected to prevent driving the engine 10 to an improper power setting and fan speed thrust level.

While there have been described herein what are considered to be preferred embodiments of the present invention, other modifications of the invention will be apparent to those skilled in the art from the teachings herein, and it is therefore desired to be secured in the appended claims all such modifications as fall within the true spirit and scope of the invention.

Accordingly, what is desired to be secured by Letters Patent of the United States is the invention as defined and differentiated in the following claims:

I claim:

1. For an aircraft installed gas turbine engine having a compressor driven by a high pressure turbine and a thrust producing fan driven by a low pressure turbine, a control system of said engine for modulating engine thrust based on an aircraft flight Mach number (Mn) value computed in said control system comprising:

means for measuring a first operating parameter of said engine;
means for generating a system ratio parameter based on said first operating parameter according to a predetermined engine schedule;
means for measuring a second operating parameter of said engine;
means for dividing said second operating parameter by said system ratio parameter to yield a calculated first quotient;
means for measuring a third operating parameter of said engine;
means for dividing said first quotient by said third operating parameter to yield a calculated second quotient;
means for generating an aircraft Mn value based on said second quotient according to a predetermined relationship; and
means for utilizing said aircraft Mn value in a power management module of said engine control to regulate said first operating parameter to produce a predetermined thrust value.

2. For an aircraft installed gas turbine engine having a compressor driven by a high pressure turbine and a thrust producing fan driven by a low pressure turbine, a method of modulating engine thrust based on an aircraft flight Mach number (Mn) value computed in a control of said engine, comprising the steps of:

measuring a first operating parameter of said engine;
generating a system ratio parameter based on said first operating parameter according to a predetermined engine schedule;
measuring a second operating parameter of said engine;
dividing said second operating parameter by said system ratio parameter to yield a calculated first quotient;
measuring a third operating parameter of said engine;
dividing said first quotient by said third operating parameter to yield a calculated second quotient;
generating an aircraft Mn value based on said second quotient according to a predetermined relationship; and
utilizing said aircraft Mn value in a power management module of said engine control to regulate said first operating parameter to produce a predetermined thrust value.

3. For an aircraft installed gas turbine engine having a compressor driven by a high pressure turbine and a thrust producing fan driven by a low pressure turbine, a method of modulating engine thrust based on an aircraft flight Mach number (Mn) value computed in a control of said engine, comprising the steps of:

measuring a first operating parmameter of said engine;

measuring a second operating parameter of said engine;

generating a first correction factor based on said second operating parameter according to a first predetermined relationship;

multiplying said first operating parameter by said correction factor to produce a first corrected operating parameter;

generating a system ratio parameter based on said first corrected operating parameter according to a predetermined engine schedule;

measuring a third operating parameter of said engine;

dividing said third operating parameter by said system ratio parameter to yield a calculated first quotient;

measuring a fourth operating parameter of said engine;

dividing said first quotient by said fourth operating parameter to yield a calculated second quotient;

generating an aircraft Mn value based on said second quotient according to a second predetermined relationship; and utilizing said aircraft Mn value in a power management module of said engine control to regulate said first corrected operating parameter to produce a predetermined thrust value.

4. The method according to claim 3 wherein the system ratio parameter generating step includes:

generating a modeled system ratio parameter based on said first corrected operating parameter according to said predetermined engine schedule; and multiplying said modeled system ratio parameter by at least a first scalar value, wherein said first scalar value is a function of said first corrected operating parameter.

5. The method according to claim 4 wherein the system ratio parameter generating step further includes:

multiplying said modeled system ratio parameter by at least a second scalar value, wherein said second scalar value is equal to unity for a first operating condition of said engine and is a function of said first corrected operating parameter for a second operating condition of said engine.

6. The method according to claim 5 wherein:

said first operating parameter comprises fan speed, N1;

said second operating parameter comprises inlet temperature, T1;

said third operating parameter comprises compressor discharge pressure, PS3;

said fourth operating parameter comprises ambient pressure, P0;

said first corrected operating parameter comprises corrected fan speed, N1R;

said system ratio parameter comprises a ratio of compressor discharge pressure, PS3, to inlet pressure, P1;

said first quotient comprises inlet pressure, P1; and said second quotient comprises a ratio of inlet pressure, P1, to ambient pressure, P0.

7. The method according to claim 6 wherein said second predetermined relationship between said aircraft Mn value and said second quotient comprises a compressible flow relationship.

8. The method according to claim 6 wherein said first predetermined relationship between said inlet temperature, T1, and said first correction factor comprises a mathematical normalization producing said first correction factor used to convert measured fan speed, N1, to corrected fan speed, N1R.

9. The method according to claim 6 wherein the ambient pressure, P0, measurement step includes:

measuring an ambient pressure sensor output, P0s;

generating a second correction factor based on a previously calculated Mn value according to a third predetermined relationship; and multiplying said sensor output, P0s, by said second correction factor to yield said ambient pressure, P0.

10. The method according to claim 5 wherein:

said second scalar value comprises a product of a plurality of additional discrete scalar values related to selectable bleed airflow from said compressor whereby:

said second scalar value is equal to unity when bleed airflow is not selected; and said second scalar value is a function of said first corrected operating parameter when bleed airflow is selected.

* * * * *